No. 785,841.

Patented March 28, 1905.

UNITED STATES PATENT OFFICE.

HENRY G. TURNER, OF LONDON, ENGLAND.

MATERIAL FOR FURNACE-LININGS.

SPECIFICATION forming part of Letters Patent No. 785,841, dated March 28, 1905.

Application filed April 24, 1903. Serial No. 154,129.

*To all whom it may concern:*

Be it known that I, HENRY GRIBBLE TURNER, a subject of the King of Great Britain, and a resident of No. 19 Sloane Gardens, in the city of London, England, have invented a new and useful Material for Furnace-Linings and other Purposes and the Process for Producing and Using the Same, which material and process are fully set forth in the following specification.

My invention relates to a material which is highly refractory to heat and oxidation and is useful for coating furnace-linings or for the lining itself, more particularly metallurgical furnaces, cement-kilns, and the like.

I heat magnesite (i. e., magnesium carbonate $MgCO_3$) in an electric furnace at the temperature of the electric arc to a point where the material crystallizes. The resulting product is allowed to cool, or it may be rapidly cooled by being poured or thrown into water or other liquid. This product will be found to be crystalline in character and black or grayish or greenish in color and has a specific gravity of 3.58. When it has cooled sufficiently to permit of its being powdered or has been rapidly cooled by being thrown or poured into water or other liquid, it is ground. The ground product is mixed with a suitable binding material, such as an aqueous solution of magnesium chlorid, water-glass, or any other substance which will harden and cause the mixture to set. The mixture is best applied as a wash to the walls of the furnace or to the furnace-lining; but it may obviously be made into bricks or plates. For example, magnesite is melted in an electric furnace. The molten magnesia is allowed to cool and is then ground very fine in a suitable mill. The powder thus produced is mixed with about two per cent. of a material like boric acid, borax, magnesium chlorid, or water-glass, which will act as a binding agent. The mixture is made into a paste with water and applied as a coating to the furnace-lining, or the mixture may be moistened with water and pressed into the form of bricks or plates, of which the furnace-lining may be built up. The bricks so formed are then baked in a suitable kiln.

I am aware that it has been proposed to manufacture refractory bricks by mixing finely-ground magnesia with a basic borate, forming a brick from the mixture, and then baking at a high temperature, and I do not claim a manufacture of this kind, it being essential to my invention that the magnesite shall be heated until it assumes a crystalline form before it is mixed with the binding material.

What I claim as my invention, and desire to secure by Letters Patent, is—

1. The process of heating magnesite in an electric furnace at the temperature of the electric arc to a point where the material crystallizes, cooling the resulting product, grinding the same and mixing it with a suitable binding material which will harden and cause the mixture to set.

2. The process of heating magnesite in an electric furnace at the temperature of the electric arc to a point where the material crystallizes, cooling the resulting product, grinding the same, mixing it with a suitable binding material, making it into a paste with water and applying it as a coating to the furnace-lining.

3. The process of heating magnesite in an electric furnace at the temperature of the electric arc to a point where the material crystallizes, cooling the resulting product, grinding the same, mixing it with a suitable binding material which will harden and cause the material to set, mixing the same with water and pressing it into the form of bricks or plates and baking the bricks or plates in a suitable kiln, substantially as described.

4. The herein-described paste composed of powdered crystallized magnesite mixed with a suitable binding material and water.

5. The brick or plate composed of crystallized magnesite mixed with a suitable binding material and water, substantially as described.

In testimony whereof I have signed this specification in the presence of two subscribing witnesses.

H. G. TURNER.

Witnesses:
 ROBERT A. PIPER,
 RICHARD F. JONES.